United States Patent [19]

Lan

[11] Patent Number: 5,765,958
[45] Date of Patent: Jun. 16, 1998

[54] PIVOT JOINT FOR A STROLLER FRAME

[76] Inventor: Red Lan, 17-22 Liu-An, Liu-An Li, Chia-Li Chen, Tainan Hsien, Taiwan

[21] Appl. No.: 819,542

[22] Filed: Mar. 17, 1997

[51] Int. Cl.$^6$ .................................................. B62B 7/08
[52] U.S. Cl. ............................. 403/97; 403/84; 403/93
[58] Field of Search ............................. 403/97, 96, 94, 403/93, 92, 84; 280/642, 650

[56] References Cited

U.S. PATENT DOCUMENTS

| | | |
|---|---|---|
| 4,815,740 | 3/1989 | Williams et al. ............... 403/97 X |
| 5,039,118 | 8/1991 | Huang ............................ 403/97 X |
| 5,133,553 | 7/1992 | Divnick .......................... 403/97 X |
| 5,520,474 | 5/1996 | Liu ................................. 403/92 X |

*Primary Examiner*—Anthony Knight
*Attorney, Agent, or Firm*—Wells, St. John, Roberts, Gregory & Matkin P.S.

[57] ABSTRACT

A pivot joint for use in a stroller frame includes a stationary seat member, a pivotable seat member mounted pivotally on the stationary seat member, a spring-loaded retaining member disposed between and engaging the stationary seat member and the pivotable seat member, and an operating knob mounted on the pivotable seat member. The stationary seat member has a confining wall with an inner surface formed with a plurality of first engaging grooves. The pivotable seat member has a surrounding wall with an inner surface formed with a plurality of second engaging grooves, each of which is defined by first and second perpendicular walls. One of the first and second perpendicular walls has an inclined cam face. The retaining member has a peripheral edge formed with a plurality of teeth for engaging the first and second engaging grooves. Each of the teeth has a follower face confronting the cam face of a respective one of the second engaging grooves such that the cam faces push the follower faces so that the retaining member can be retracted entirely into the stationary seat member for disengagement from the pivotable seat member when the pivot seat member rotates relative to the stationary seat member in a certain direction.

3 Claims, 8 Drawing Sheets

PIVOT JOINT FOR A STROLLER FRAME

BACKGROUND OF THE INVENTION

Field of the Invention

The present invention relates to a pivot joint for use in a stroller frame, more particularly to a pivot joint which can be more conveniently operated for adjusting the relative positions of the frame portions connected thereto.

2. Description of the Related Art

Figure 1:
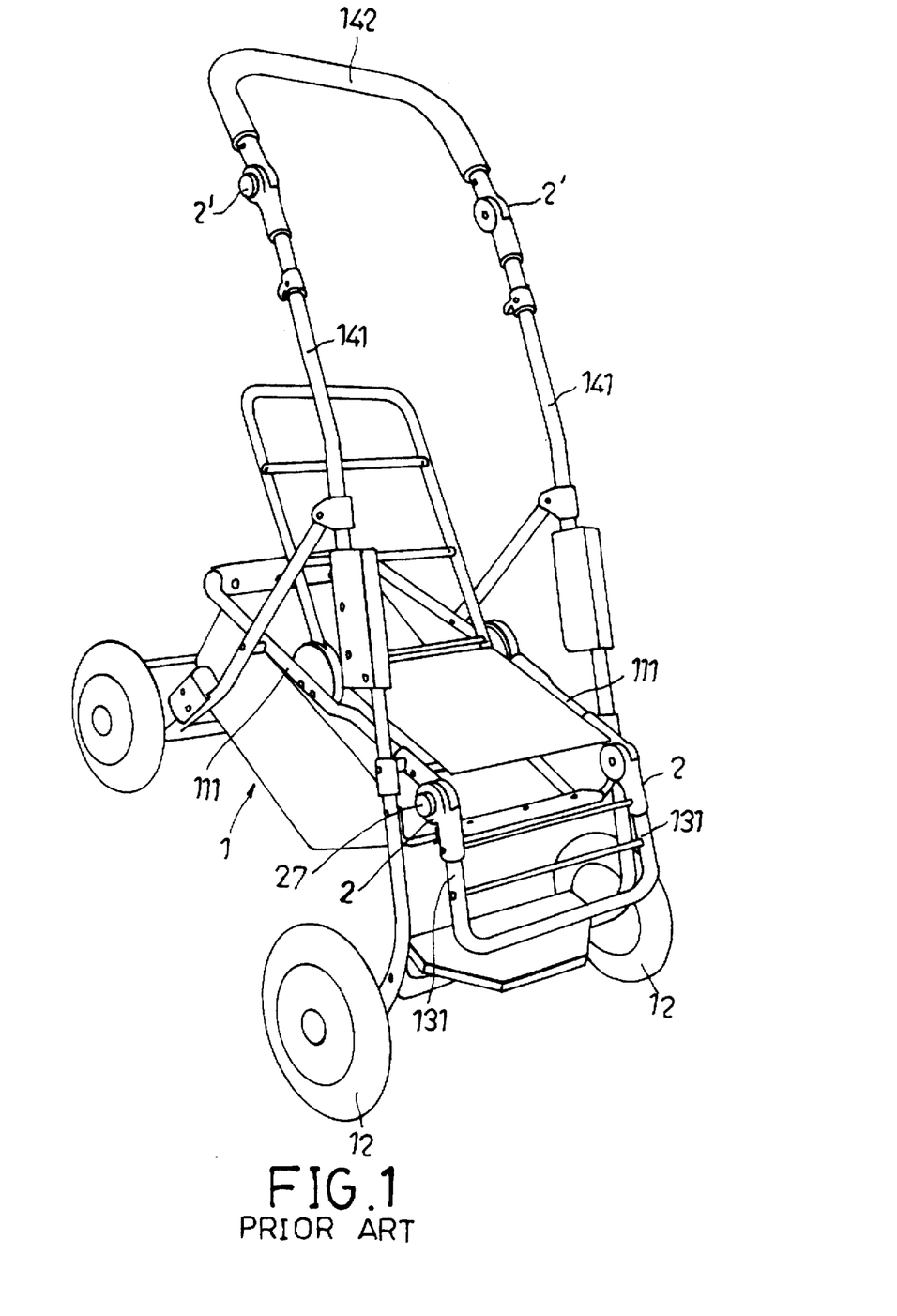
FIG. 1 is a perspective view illustrating a stroller frame having conventional pivot joints mounted thereon.

FIG. 1 illustrates a stroller frame provided with a conventional pivot joint. The stroller frame is shown to include a main frame body 1 and four wheels 12 mounted on bottom portion of the main frame body 1. The main frame body 1 has a lower leg frame 131 which is connected to a seat frame 111 by means of a pair of conventional pivot joints 2. The main frame body 1 further has an upper frame portion 141 which is connected to a handle frame 142 by means of a pair of conventional pivot joints 2' similar to the pivot joints 2.

Figure 2:
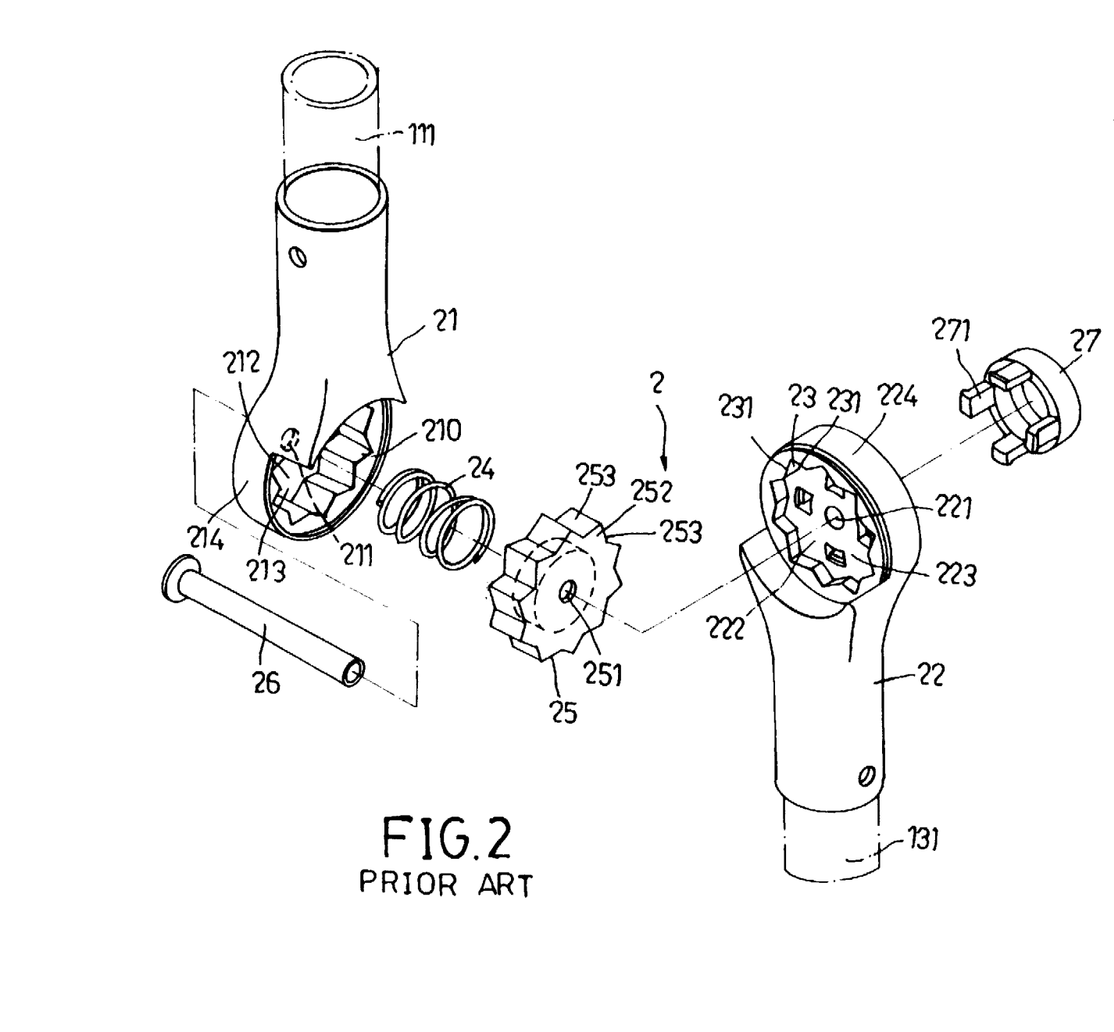
FIG. 2 is an exploded perspective view illustrating one of the conventional pivot joints used in the stroller of FIG. 1.
Figure 3:
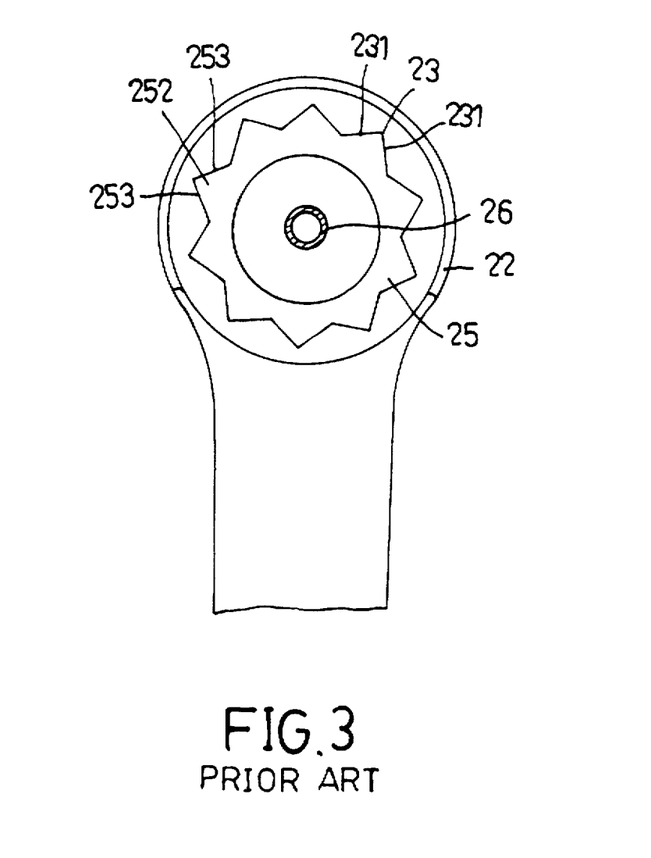
FIG. 3 is a schematic view illustrating the engagement between the pivotable seat member and the retaining member of the conventional pivot joint.

Referring to FIGS. 2 and 3, the pivot joint 2 is shown to include a stationary seat member 21 and a pivotable seat member 22. The stationary seat member 21 is connected to one end of the seat frame 111, while the pivotable seat member 22 is connected to one end of the leg frame 131. The stationary seat member 21 has an end wall 213 and a confining wall 214 which extends transversely from the end wall 213 and which cooperates with the end wall 213 to confine a cylindrical recess 212. The end wall 213 is formed with a central pivot hole 211. The confining wall 214 has an inner surface formed with a plurality of V-shaped first engaging grooves 210. The pivotable seat member 22 has a base wall 223 and a surrounding wall 224 which extends transversely from the base wall 223 and which cooperates with the base wall 223 to confine a cylindrical cavity 222 that confronts the cylindrical recess 212. The surrounding wall 224 has an inner surface formed with a plurality of V-shaped second engaging grooves 23. Each of the second engaging grooves 23 is defined by two perpendicular walls 231 that are perpendicular to the base wall 223. The base wall 223 is formed with a central opening 221 that is aligned with the central pivot hole 211 of the stationary seat member 21. A biasing spring 24 and a retaining member 25 are received in the cylindrical recess 212 of the stationary seat member 21. The retaining member 25 is biased by the biasing spring 24 to extend into the cylindrical cavity 222 of the pivotable seat member 22. The retaining member 25 has a generally circular peripheral edge formed with a plurality of substantially triangular teeth 252 for engaging the first and second engaging grooves 210, 23. Each of the teeth 252 has two flat retaining surfaces 253 that are perpendicular to the base wall 223 of the pivotable seat member 22. The retaining member 25 is further formed with a central through hole 251 that is aligned with the central pivot hole 211 of the stationary seat member 21 and the central opening 221 of the pivotable seat member 22. A pivot pin 26 extends through the pivot hole 211 of the stationary seat member 21, the central through hole 251 of the retaining member 25 and the central opening 221 of the pivotable seat member 22 so as to connect the pivotable seat member 22 pivotally to the stationary seat member 21. An operating knob 27 is mounted on an outer side of the base wall 223 of the pivotable seat member 22. The operating knob 27 is formed with a plurality of extensions 271 that extend through the base wall 223 to abut against the retaining member 25. The operating knob 27 is operable to push the retaining member 25 inwardly to disengage the pivotable seat member 22.

To adjust the relative positions between the leg frame 131 and the seat frame 111, the operating knobs 27 are pressed inwardly to push the retaining members 25 toward the stationary seat members 21 against biasing actions of the biasing springs 24 so that the retaining members 25 are entirely retracted into the cylindrical recesses 212 of the stationary seat members 21 and are disengaged from the pivotable seat members 22. The leg frame 131 connected to the pivotable seat member 22 can thus be turned upwardly or downwardly into a desired position. The operating knobs 27 are released so that the retaining members 25 engage the pivotable seat members 22 once again after the leg frame 131 has been adjusted to the desired position.

Since the teeth 252 of the retaining member 25 engage the second engaging grooves 23 fittingly, as best illustrated in FIG. 3, the operating knobs 27 must be pressed at the same time when the leg frame 131 connected to the pivotable seat member 22 is to be turned upwardly and downwardly. The aforementioned pivot joint is thus not convenient to use.

SUMMARY OF THE INVENTION

The main object of the present invention is to provide a pivot joint which can be easily operated for adjusting the relative positions of first and second frame portions connected thereto.

Accordingly, the pivot joint of the present invention is adapted to interconnect first and second frame portions of a stroller frame. The pivot joint includes a stationary seat member, a pivotable seat member, a retaining member, a biasing spring, a pivot pin, and an operating knob. The stationary seat member is adapted to be connected to the first frame portion. The stationary seat member has an end wall and a confining wall extending transversely from one side of the end wall and cooperating with the end wall to confine a cylindrical recess. The confining wall has an inner surface formed with a plurality of axially extending first engaging grooves. The pivotable seat member is adapted to be connected to the second frame portion. The pivotable seat member has a base wall and a surrounding wall extending transversely from the base wall and cooperating with the base wall to confine a cylindrical cavity which confronts the cylindrical recess of the stationary seat member. The surrounding wall has an inner surface formed with a plurality of axially extending second engaging grooves. The retaining member is received in the cylindrical recess of the stationary seat member and is axially slidable in the cylindrical recess. The retaining member has a peripheral edge formed with a plurality of teeth for engaging the first and second engaging grooves. The biasing spring is receiving in the cylindrical recess of the stationary seat member for biasing the retaining member to extend into the cylindrical cavity of the pivotable seat member so that the teeth of the retaining member engage the second engaging grooves of the pivotable seat member. The pivot pin extends through the stationary seat member, the retaining member and the pivotable seat member for connecting pivotally the pivotable seat member to the stationary seat member. The operating knob is mounted on an outer side of the base wall of the pivotable seat member. The operating knob is formed with at least one extension that extends through the base wall of the pivotable seat member and that abuts against the retaining member for pushing the retaining member into the cylindrical recess against biasing action of the biasing spring to disengage the retaining member from the pivotable seat member. Each of the second engaging grooves of the pivotable seat member is defined by first and second perpendicular walls which are perpendicular to the base wall of the pivotable seat member and which are arranged in a substantially V-shaped formation. The second perpendicular wall has an inclined cam face which interconnects the second perpendicular wall and an end face of the surrounding wall opposite to the base wall. The cam face inclines radial inward and toward the base wall. Each of the teeth of the retaining member has a follower face confronting the cam face of a respective one of the second engaging grooves such that the cam faces push the follower faces so that the retaining member can be retracted entirely into the cylindrical recess of the stationary seat: member when the pivotable seat member rotates relative to the stationary seat member in a certain direction.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
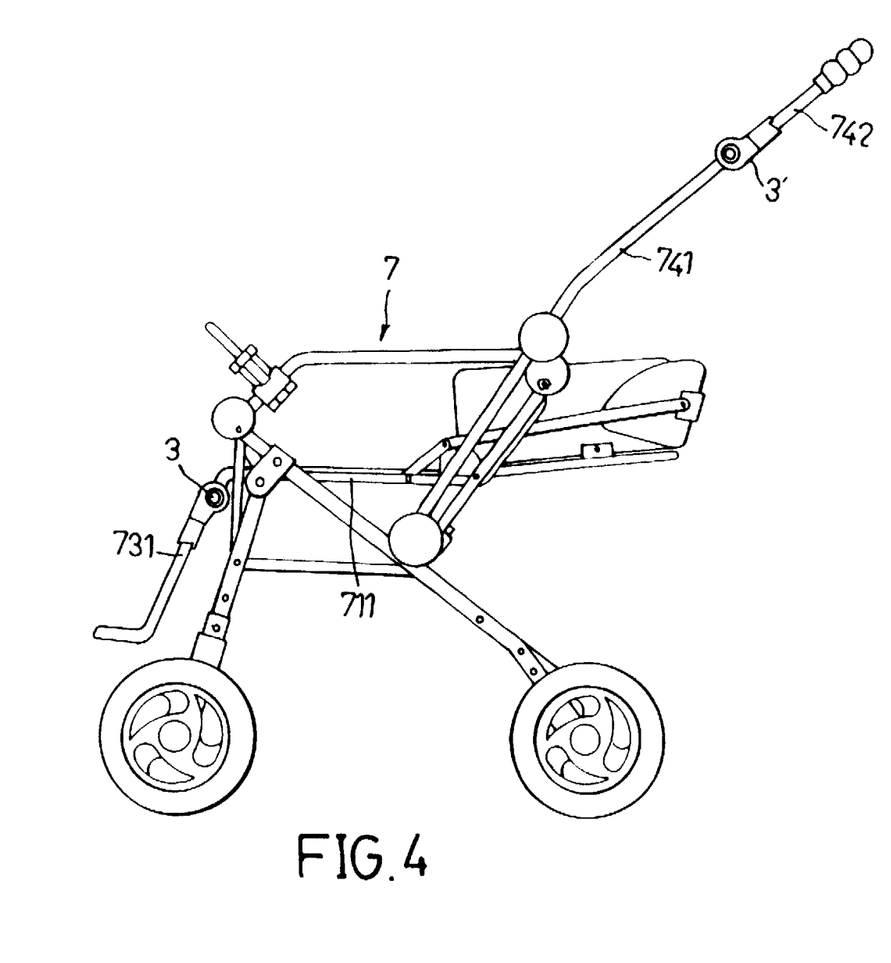
FIG. 4 is a side view illustrating a stroller frame that is provided with pivot joints according to a preferred embodiment of the present invention.

Referring to FIG. 4, a pair of pivot joints 3 according to a preferred embodiment of the present: invention are mounted on a stroller frame 7 for interconnecting a leg frame portion 731 and a seat frame portion 711. A pair of pivot joints 3' similar to the pivot joint 3 are also mounted on the stroller frame for interconnecting an upper frame portion 741 and a handle frame portion 742. The present embodiment is illustrated in terms of the pivot joint 3 mounted on the left-hand side of the stroller frame.

Figure 5:
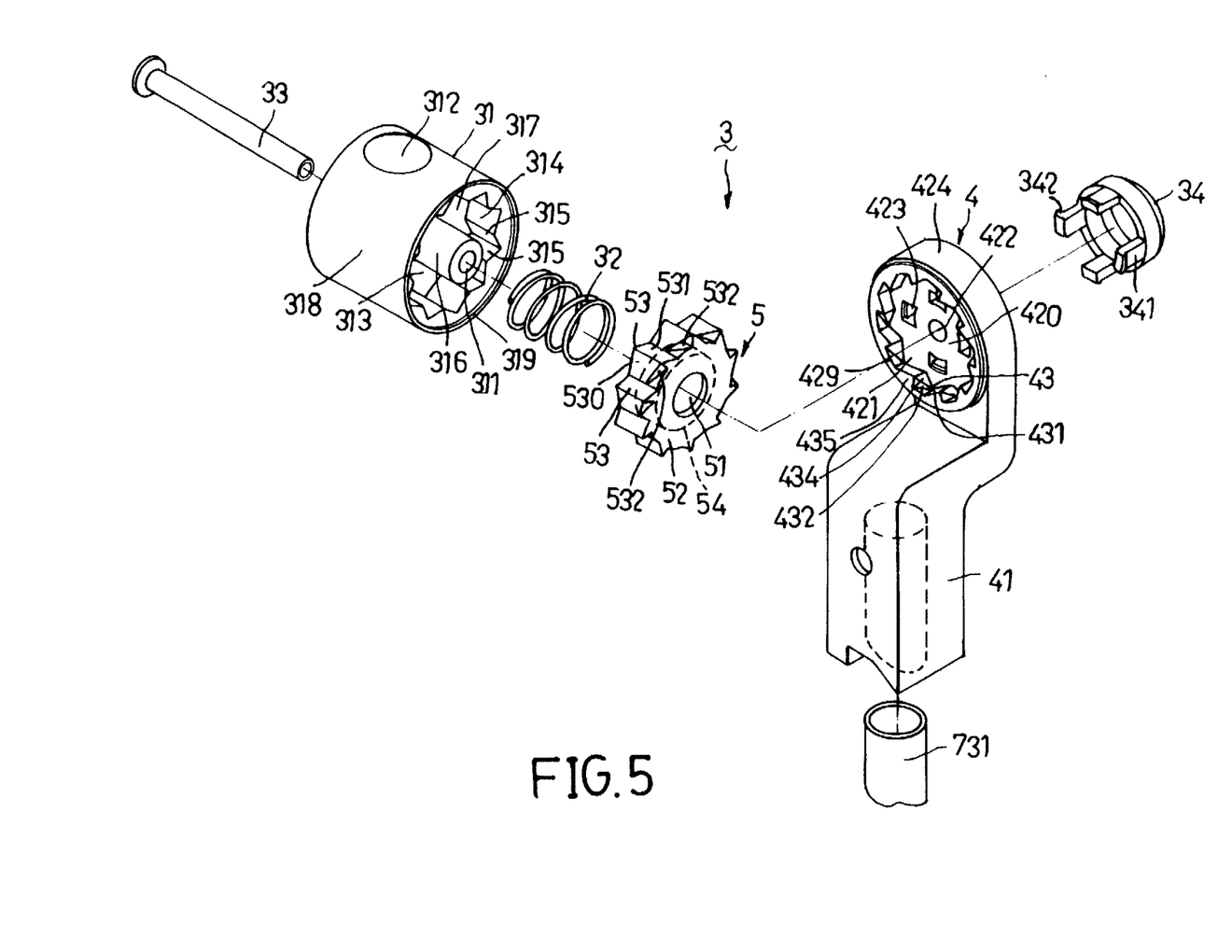
FIG. 5 is an exploded perspective views illustrating the pivot joint according to the preferred embodiment.
Figure 6:
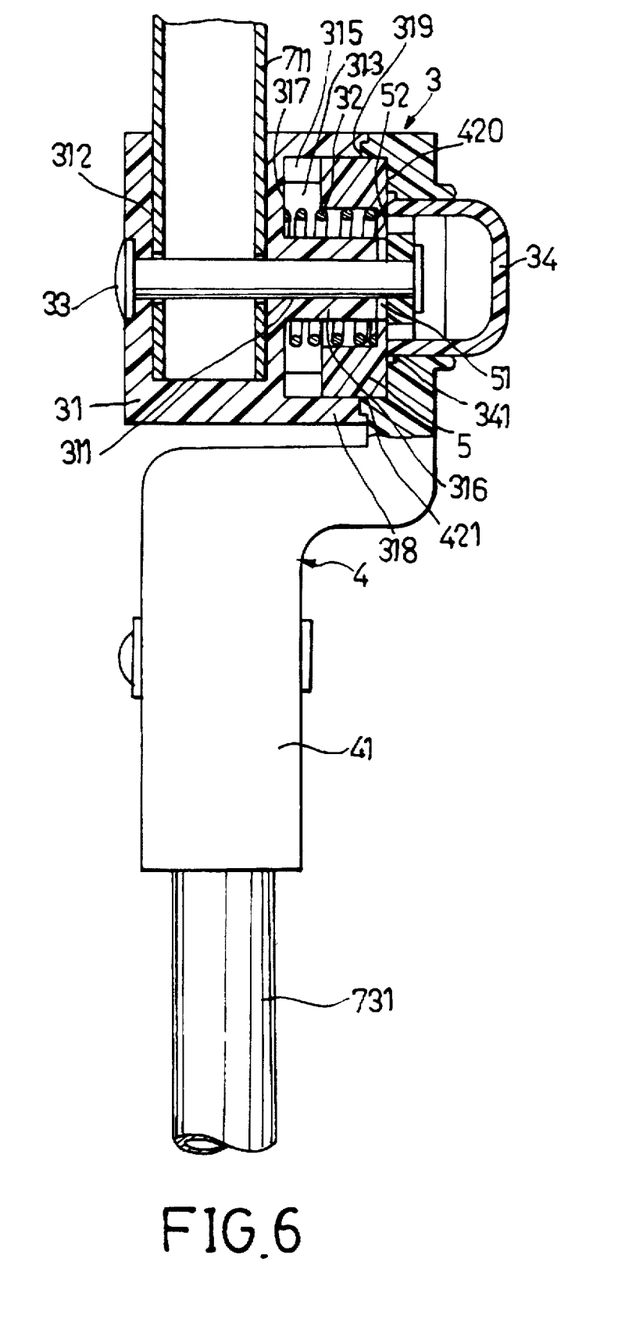
FIG. 6 is a cross-sectional view of the pivot joint according to the preferred embodiment.

Referring to FIGS. 5 and 6, the pivot joint 3 includes a stationary seat member 31, a pivotable seat member 4, a retaining member 5, a biasing spring 32, a pivot pin 33 and an operating knob 34.

The stationary seat member 31 is shaped as a hollow cylinder formed with an insert hole 312 to permit insertion of the seat frame portion 711 therein. The stationary seat member 31 includes an end wall 317 and a confining wall 318 which extends transversely from one side of the end wall 317 and which cooperates with the end wall 317 to confine a cylindrical recess 313 with an open end 319. The confining wall 318 has an inner surface formed with a plurality of axially extending first engaging grooves 314. Each of the first engaging grooves 314 is defined by two perpendicular walls 315 which are perpendicular to the end wall 317 and which are arranged in a V-shaped formation.

The stationary seat member 31 is formed with an axial positioning tube 316 that extends from the end wall 317 and that confines a first pivot hole 311 therethrough.

The pivotable seat member 4 has a downwardly extending coupling portion 41 that is adapted to be connected with the leg frame portion 731. The pivotable seat member 4 has a base wall 420 and a surrounding wall 424 which extends transversely from the base wall 420 and which cooperates with the base wall 420 to confine a cylindrical cavity 421 that confronts the cylindrical recess 313 of the stationary seat member 31 and that has an open end 429. The base wall 420 has a second pivot hole 422 aligned with the first pivot hole 311 and a plurality of mounting holes 423 formed therethrough. The surrounding wall 424 has an inner surface formed with a plurality of second engaging grooves 43.

The retaining member 5 has a thickness not greater than the depth of the cylindrical recess 313 of the stationary seat 31, but greater than the depth of the cylindrical cavity 421 of the pivotable seat member 4. The retaining member 5 is received in the cylindrical recess 313 of the stationary seat member 31 and is slidable axially in the cylindrical recess 313. The retaining member 5 has a peripheral edge formed with a plurality of teeth 53 having substantially triangular cross-sections for engaging the first and second engaging grooves 314, 43. The retaining member 5 has a first side that faces the pivotable seat member 4 and that has a substantially flat surface 52. The retaining member 5 further has a second side that faces the stationary seat member 31 and that has a cylindrical indented part 54. The retaining member 5 is formed with a central opening 51 at the indented part 54 to permit extension of the positioning tube 316 of the stationary seat member 31 therethrough.

The biasing spring 32 is received in the cylindrical recess 313 and is disposed around the positioning tube 316 of the stationary seat member 31. The biasing spring 32 extends into the indented part 54 of the retaining member 5 and abuts against the retaining member 5 for biasing the retaining member 5 to extend into the cylindrical cavity 421 of the pivotable seat member 4 so that the teeth 53 of the retaining member 5 engage the second engaging grooves 43 of the pivotable seat member 4.

The pivot pin 33 extends through the first pivot: hole 311 in the stationary seat member 31, the biasing spring 32, the central opening 51 in the retaining member 5 and the second pivot hole 422 in the pivotable seat member 4 for connecting pivotally the pivotable seat member 4 to the stationary seat member 31.

The operating knob 34 is mounted on an outer side of the base wall 420 of the pivotable seat member 4. The operating knob 34 is formed with at least one extension 341 that extends through the base wall 420 of the pivotable seat member 4. Each of the extensions 341 has a tapering end 342 which can be hooked at the base wall 420 after extending through the base wall 420. The extensions 341 abut against the flat surface 52 of the retaining member 5 for pushing the retaining member 5 into the cylindrical recess 313 against biasing action of the biasing spring 32 to disengage the retaining member 5 from the pivotable seat member 4.

Figure 7:
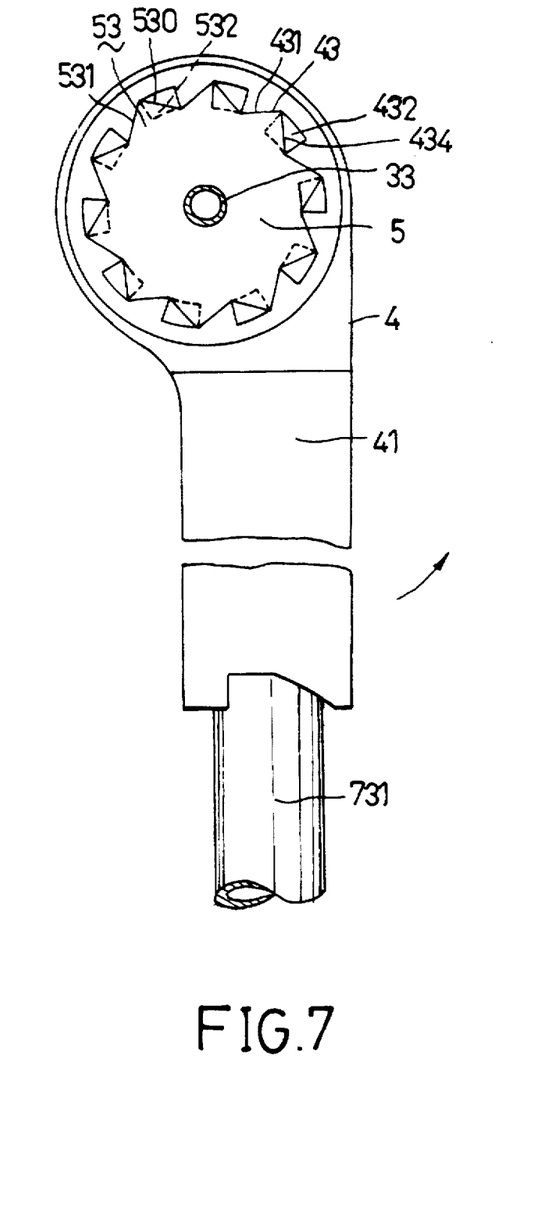
FIG. 7 is a schematic view illustrating the engagement between a pivotable seat member and a retaining member of the pivot joint according to the preferred embodiment.

Referring to FIGS. 5 and 7, each of the second engaging grooves 43 of the pivotable seat member 4 is defined by a first perpendicular wall 431 and a second perpendicular wall 434 which are perpendicular to the base wall 420 of the pivotable seat member 4. The first and second perpendicular walls 431, 434 are arranged in a substantially V-shaped formation. The second perpendicular wall 434 has an inclined cam face 432 which interconnects the second perpendicular wall 434 and an end face 435 of the surrounding wall 424 opposite to the base wall 420. The cam face 432 inclines radial inward from the inner surface of the surrounding wall 424 and toward the base wall 420. The cam face 432 diverges gradually in a direction from the base wall 420 to the end face 435 of the surrounding wall 424.

Each of the teeth 53 of the retaining member 5 has first and second retaining walls 530, 531 which are perpendicular to the flat surface 52 of the retaining member 5 and to the base wall 420 of the pivotable seat member 4. The first retaining wall 530 has one end chamfered to define a follower face 532 which is adjacent to the pivotable seat member 4 and which confronts the cam face 432 of a respective one of the second engaging grooves 43. The cam faces 432 push the follower faces 532 so that the retaining member 5 can be retracted entirely into the cylindrical recess 311 of the stationary seat member 31 when the pivotable seat member 5 rotates relative to the stationary seat member 31 in a certain direction, i.e., in the counter-clockwise direction in this embodiment.

Referring to FIGS. 4 and 6, normally, the retaining member 5 is biased by the biasing spring 32 so that the teeth 53 engage simultaneously the first and second engaging grooves 314, 43 of the stationary seat member 31 and the pivotable seat member 4 for retaining the same at a desired relative position.

Figure 8:
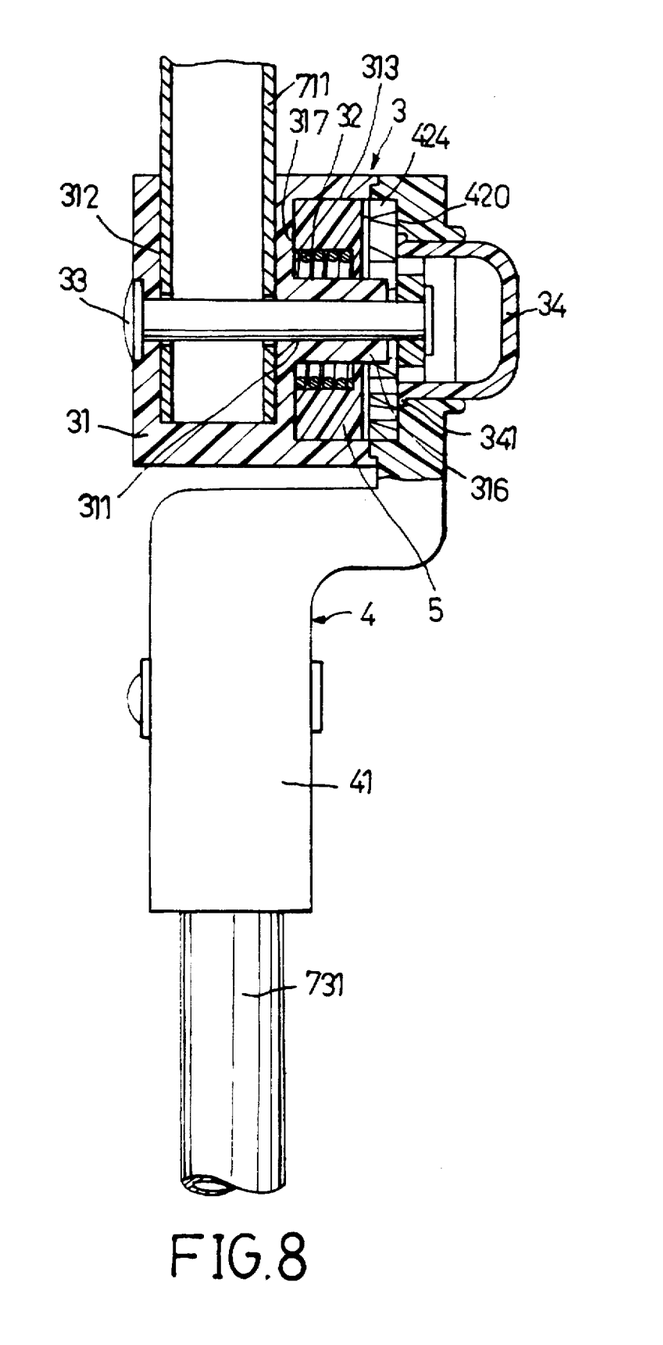
FIG. 8 is a cross-sectional view of the pivot joint according to the preferred embodiment when the position of the pivotable seat member is to be adjusted.

Referring to FIGS. 7 and 8, when the leg frame portion 731 is lifted upwardly to cause counter-clockwise rotation of the pivotable seat member 4 relative to the retaining member 5, the cam faces 432 of the pivotable seat member 4 push the follower faces 532 of the retaining member 5 so that the retaining member 5 is moved against the biasing action of the biasing spring 32 toward the stationary seat member 31. When the retaining member 5 is retracted entirely into the cylindrical recess 313 of the stationary seat member 31, as shown in FIG. 8, the retaining member 5 disengages the pivotable seat member 4 to permit adjustment of the leg frame portion 731 to a desired orientation. Therefore, operation of the operating knob 34 is not necessary when the leg frame portion 731 is to be turned upwardly.

Referring to FIGS. 6 and 7, when the leg frame portion 731 is to be turned downwardly, the operating knob 34 is pressed inwardly to push the retaining member 5 into the cylindrical recess 313 of the stationary seat member 31 for disengagement from the pivotable seat member 4. The operating knob 34 is released after the leg frame portion 731 has been adjusted to the desired position.

It should be noted that the structure of the pivot joint mounted on the right-hand side of the stroller frame is symmetric to the aforementioned pivot joint 3 mounted on the left-hand side of the stroller frame, as shown in FIG. 4. Therefore, when the leg frame portion 731 is turned upwardly, the pivotable seat member of the right-hand side pivot joint rotates in a clockwise direction relative to the retaining member. In addition, the pivot joint 31 mounted between the upper frame portion 741 and the handle frame portion 742 has a structure similar to the pivot joint 3 described beforehand.

It has thus been shown that the pivot joint 3 according to the present invention permits the leg frame portion 731 to be turned upwardly and to be positioned therein by merely lifting the leg frame portion 731 to the desired position without the need for operating the operating knob 34. The pivot joint 3 of the present invention is thus more convenient to use as compared to the conventional ones. Moreover, the pivot joint of the present invention can be used for interconnecting different frame portions of the stroller to permit adjustment of the relative positions of these frame portions.

With this invention thus explained, it, is apparent that numerous modifications and variations can be made without departing from the scope and spirit of this invention. It is therefore intended that this invention be limited only as indicated in the appended claims.

I claim:

1. A pivot joint adapted to interconnect first and second frame portions of a stroller frame, comprising:

a stationary seat member adapted to be connected to the first frame portion, said stationary seat member having an end wall and a confining wall extending transversely from one side of said end wall and cooperating with said end wall to confine a cylindrical recess, said confining wall having an inner surface formed with a plurality of axially extending first engaging grooves;

a pivotable seat member adapted to be connected to the second frame portion, said pivotable seat member having a base wall and a surrounding wall extending transversely from said base wall and cooperating with said base wall to confine a cylindrical cavity which confronts said cylindrical recess of said stationary seat member, said surrounding wall having an inner surface formed with a plurality of axially extending second engaging grooves;

a retaining member received in said cylindrical recess of said stationary seat member and axially slidable in said cylindrical recess, said retaining member having a peripheral edge formed with a plurality of teeth for engaging said first and second engaging grooves;

a biasing spring receiving in said cylindrical recess of said stationary seat member for biasing said retaining member to extend into said cylindrical cavity of said pivotable seat member so that said teeth of said retaining member engage said second engaging grooves of said pivotable seat member;

a pivot pin extending through said stationary seat member, said retaining member and said pivotable seat member for connecting pivotally said pivotable seat member to said stationary seat member; and an operating knob mounted on an outer side of said base wall of said pivotable seat member, said operating knob being formed with at least one extension that extends through said base wall of said pivotable seat member and that abuts against said retaining member for pushing said retaining member into said cylindrical recess against biasing action of said biasing spring to disengage said retaining member from said pivotable seat member;

each of said second engaging grooves of said pivotable seat member being defined by first and second perpendicular walls which are perpendicular to said base wall of said pivotable seat member and which are arranged in a substantially inverted V-shaped formation, said second perpendicular wall having an inclined cam face which interconnects said second perpendicular wall and an end face of said surrounding wall opposite to said base wall, said cam face inclining radial inward and toward said base wall;

each of said teeth of said retaining member having a follower face confronting said cam face of a respective one of said second engaging grooves such that said cam faces push said follower faces so that said retaining member can be retracted entirely into said cylindrical recess of said stationary seat member when said pivotable seat member rotates relative to said stationary seat member in a certain direction.

2. The pivot joint according to claim 1, wherein said retaining member has an indented part to permit extension of said biasing spring therein.

3. The pivot joint according to claim 2, wherein said stationary seat member is formed with an axial, positioning tube extending from said end wall and confining a pivot hole to permit extension of said pivot pin therethrough, said positioning tube having said biasing spring disposed therearound and extending through said retaining member.

* * * * *